O. A. ECKRE.
RESILIENT TIRE.
APPLICATION FILED JAN. 25, 1918.
1,278,447.
Patented Sept. 10, 1918.
2 SHEETS—SHEET 1.
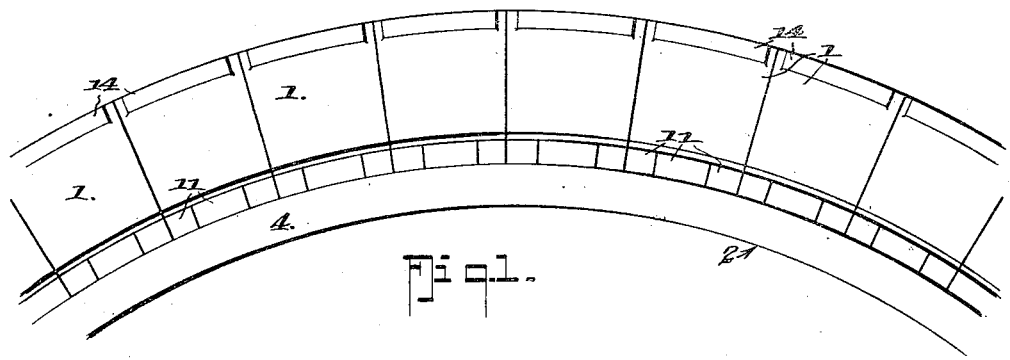
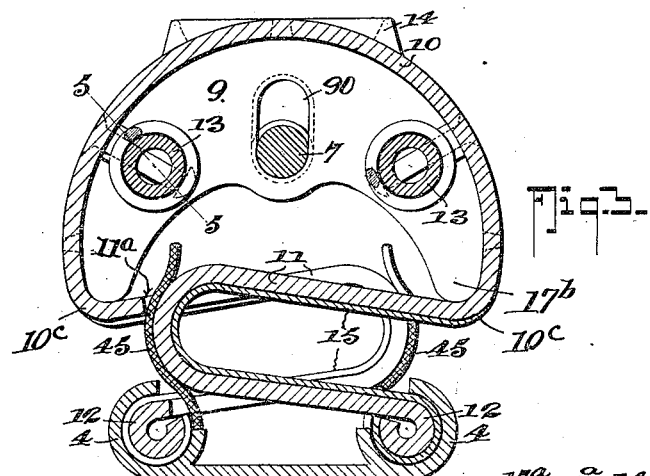
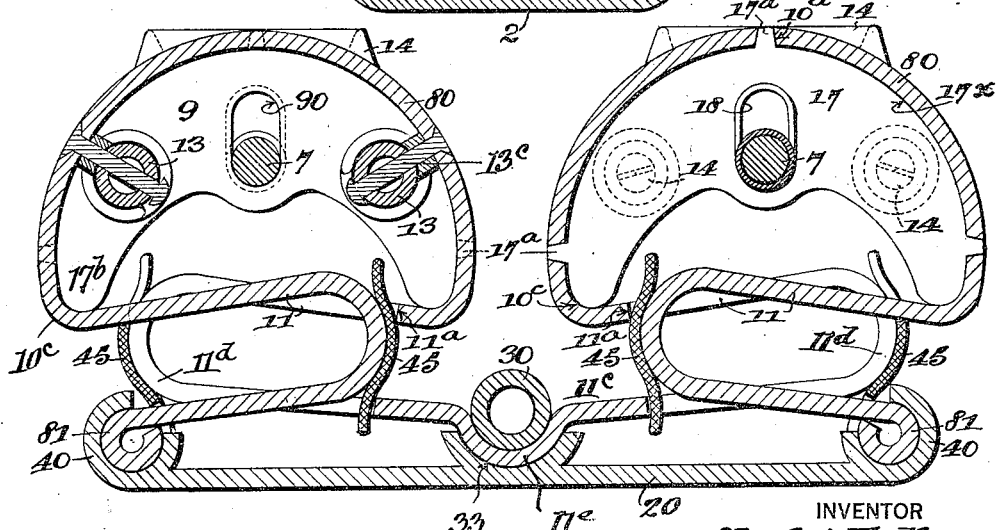
INVENTOR
Olaf A. Eckre.
BY
Fred G. Dieterich & Co.
ATTORNEYS

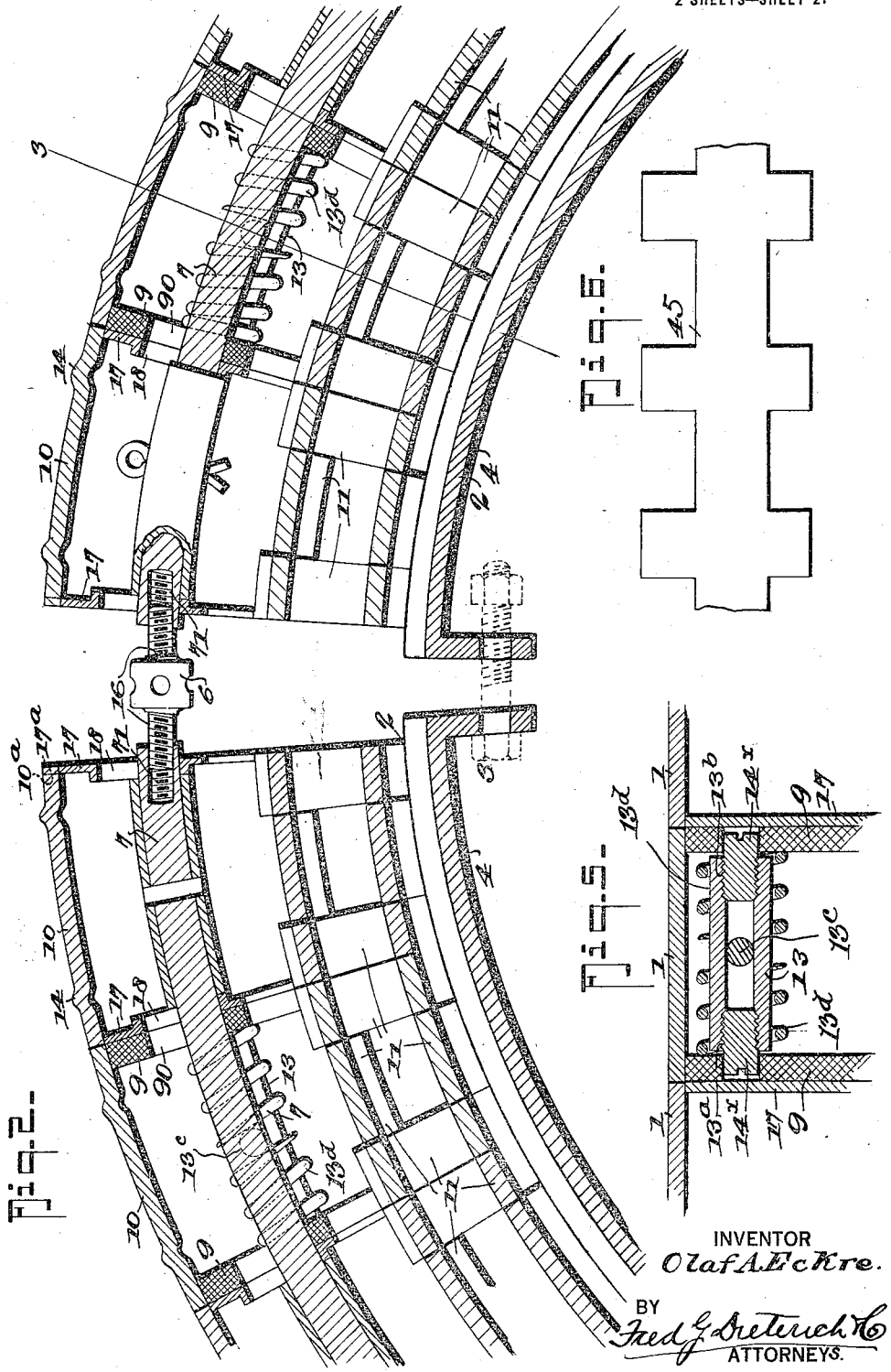

UNITED STATES PATENT OFFICE.

OLOF A. ECKRE, OF KINDRED, NORTH DAKOTA.

RESILIENT TIRE.

1,278,447.　　　　　Specification of Letters Patent.　　Patented Sept. 10, 1918.

Application filed January 25, 1918.　Serial No. 213,658.

*To all whom it may concern:*

Be it known that I, OLOF A. ECKRE, a citizen of the United States, residing at Kindred, in the county of Cass and State of North Dakota, have invented certain new and useful Improvements in Resilient Tires, of which the following is a specification.

My present invention, which generally relates to improvements in motor vehicle wheels, more particularly has reference to improvements in that form of spring wheel construction disclosed in my Patent No. 1,259,004, issued March 12, 1918, and my said invention primarily has for its purpose to provide an improved resilient tire construction in which the parts are especially designed and coöperatively so connected, whereby the spring members are securely maintained in the desired coacting positions, when traveling under high speeds and turning a corner or curve.

Another object of my present invention is to provide certain improvements in spring tire construction, of the general character mentioned, that includes a special external shape of the individual spring elements that, in the assembled arrangement, constitute the complete tire, whereby to provide a tread portion of great tractive power and which forms a substantial and practical substitute for the conventional types of pneumatic and cushion tires.

With the above objects in view, my present invention consists in the improved resilient tire construction referred to in the following description, specifically pointed out in the appended claims and illustrated in the accompanying drawings, in which:

Figure 1 is a side elevation of a portion of a spring wheel that embodies my improved resilient tire construction, the mud and sand guard being omitted.

Fig. 2 is an enlarged longitudinal section of the separated ends of the rim and the resilient tire portions attached thereto, together with the coupling device hereinafter specifically mentioned.

Fig. 3 is a cross section of my improved resilient tire construction taken on the line 3—3 on Fig. 2 and illustrates a preferred form of the spring units, the supplemental spring members hereinafter referred to being shown in this view.

Fig. 4 is a view similar to Fig. 3 but taken on different planes and illustrates a somewhat modified form of the spring units, which, when assembled, form the complete tire.

Fig. 5 is a detail section on the line 5—5 on Fig. 3.

Fig. 6 is a detail of a portion of one of the belts for keeping mud and sand out of the spring units.

In my present construction of resilient tire, the tire consists of a number of spring units designed for being individually applied to and connected with the split rim of the wheel and each unit assembled around the rim until the complete annular tire portion is formed thereon, means being also provided, in my present invention, for drawing the ends of the rim together and locking the tire members in the desired operative condition on the split rim and the rim ends secured together.

In my present construction of resilient tire, each of the spring units consists of a wedge-shaped member 1, the wide or tread portion of which is bent to form a substantially semi-circular spring loop 10, the free ends of which are bent inwardly to form transversely disposed elongated loop portions 11, the loop portion at one side being cut out or bifurcated as at 11ᵃ to receive the opposing loop portion therebetween, to provide for the two spring loops 11—11 crossing each other, as is best shown in Fig. 3, by reference to which it will be also noticed the free ends of the loops 11—11 terminate in circular members 12, the purpose of which will presently appear.

2 designates the wheel rim, the split or separated ends of which terminate in inwardly projected apertured members 20—20 for receiving the clamping bolt and nut devices 3—30, as shown.

In my present resilient tire construction, the rim 2 is also formed at the opposite edges with annular pockets 4—4 for receiving the circular members 12—12 of the spring units 1, by which the said units are firmly interlocked with the rim and against lateral displacement.

In practice, the spring units 1 are first placed edgewise between the separated ends of the rim and are then forced sidewise along the peripheral rim surface and with their loops 12 in engagement with the pockets 4—4.

To provide a positive tractive engagement of the tire as it travels, the outer or tread face of each of the spring units has a squared like rib 14, V-shaped in cross section, that is pressed out from the tread face of the spring and which provides for holding the tire against slipping and skidding and for effecting a positive tractive engagement with the road surface over which the wheel may be passing.

By referring now more particularly to Fig. 2, it will be noticed, the spring units are held together and joined by, what I term, a bumper ring that passes through the entire annular series of spring units and has its ends connected with an adjusting means for drawing them together, when finishing up the fitting of the annular series of spring elements around the rim 2.

One of the members 1 of each adjacent pair of the spring or tread units has a sheet metal spacer plate 17 at each end thereof and each of the said spacer plates has a peripheral bearing portion 17$^x$ cut on the arc of a circle with which, when the parts are assembled, the curved or tread portion of the spring or tread unit 1 is held in engagement.

The opposite ends of the said spacer plate 17 are rounded as at 17$^b$ for resting in the curved seats 10$^c$ formed on the spring members 1 where they begin to extend in transverse direction and cross each other.

Each plate 17 has a centrally disposed radially extended slot 18 through which the bumper ring, before referred to, passes and which primarily has for its purpose to keep the annular series of spring units 1 in a straight row or alinement.

Plates 17—17 are provided in each alternate ones of the complete ring of spring units, as is clearly shown in Fig. 2, and the said plates 17, are held against transverse displacement by radial ribs 17$^a$ that engage seats or notches 10$^a$ in the spring members, as shown.

By forming the plates 17 with the elongated slots 18, ample space is provided on top of the bumper ring so the spring elements can go down to the top of the said ring only, it being understood that, when the spring members, under a bump or other strain, are forced inwardly and engage the bumper ring, the strain is then transmitted through the said ring to the transversely or crossed loop portions of the spring units 1.

The alternate ones of the spring units include end plates 9 of fiber or other suitable material, also shaped to fit within and against the spring members in which they are held and the said plates 9, which are loosely mounted on their respective members 1, are held pressed outwardly against the plates 17 of the adjacent units 1, to thereby make the connection of the several co-engaging parts practically noiseless when the spring units rub against each other and at the same time make the said connections mud and dust proof.

The bumper ring 7, before referred to, extends entirely around the wheel rim and through all of the plates 17 and the radially elongated slots 90 in the end members 9 and for conveniently drawing up the said ring after the required spring sections have been assembled, a turn buckle connection 6, that has opposite threaded ends 16, engages the right and left screw sockets 71 and 71 in the said ring, as shown.

For holding the loosely held end plates 9—9 pressed up against the plates 17, located in the alternate ones of the units 1, a pair of tubular spacing members 13—13 are located between each pair of the said plates 9—9 and the opposite ends of the said members 13—13 have screw sockets 13$^a$—13$^a$ for receiving the ends of guide screws 14$^x$—14$^x$ that pass through apertures in the plates 9—9, as is clearly shown in Fig. 5.

The tubular members 13 are held in rigid position, relatively to the members 1 in which they are mounted, by rivet bolts 13$^c$ that pass through the members 13 and connect with the said members and the metal loop 10 of which the unit or member 1 is formed, as is clearly shown in Figs. 3 and 4. The rivet bolt 13$^c$ also forms a central abutment for the adjacent ends of coiled spring sections 13$^d$—13$^d$ mounted on the tubular spacing members 13 and whose other ends engage with and hold the end plates 9—9 normally up against the spacing plates 17—17.

15—15 denote supplemental loop springs that fit within and reinforce the crossed loop ends of the springs 1, see Fig. 3. The members 15 may be omitted when my resilient tire is used for light load wheels.

In Fig. 4, I have shown a modified form of my resilient tire in which the same features of construction that are embodied in the other or preferred form, is included.

In the modified form, the members 1, instead of being bent into a single tread loop or portion and a pair of crossed loop portions, as shown in Figs. 1, 2 and 3, the tire is formed of two semi-circular loops or tread units 80—80 and the adjacent ends of the two units are bent into a loop 11$^c$ that extends across the full width of a rim 20 which is double the width of the rim 2 in the other form of my invention described.

The loop portion 11$^c$ referred to includes a centrally disposed concaved portion 11$^e$ that engages a central annular groove 33 in the rim 20.

In the modified form, the rim has a central annular seat groove 33 in which is received the curved portion of the cross over members of the inner loops that connect with the treads 80.

30 designates a central tire securing ring, which, in practice, may be a split ring having an ordinary turn buckle connection (not shown) at the meeting ends thereof.

From the foregoing taken in connection with the drawings, the complete construction and the advantages of my present invention will be readily understood by those skilled in the art to which my said invention relates.

While I have described and shown my improved resilient tire construction as particularly adapted for use on spring wheels, the same is not necessarily restricted to spring wheels, since it may be readily adapted for being mounted on wheels having rigid spoke and hub connections.

For keeping mud and sand from working into the tire, the exposed or crossed loop portions of the annular ring of spring units are covered at each side by canvas bands or belts 45—45, as indicated in Figs. 3 and 4.

What I claim is:

1. In a spring wheel, the combination with a split rim and means for drawing up the ends thereof; of a tire composed of tread units, each formed of spring metal bent into an arch shaped tread face and the free ends bent inwardly extended across loops, interlocking members on the rim and the ends of each of the tread units, and means for securing the said tread units in annular relation on the rim.

2. In a spring wheel, the combination with a split rim and means for drawing up the ends thereof; of a tire composed of tread units, each formed of spring metal bent into an arch shaped tread face and the free ends bent into inwardly extended crossed loops, interlocking members on the rim and the ends of each of the tread units, means for securing the said tread units in annular relation on the rim, and arch shaped spacer members coöperative with the arch shaped portions of each of the spring units for holding the said units to their shape.

3. In a spring wheel, the combination with a split rim and means for drawing up the ends thereof; of a tire composed of tread units, each of the said tread units being formed of spring metal bent into a semicircular shape tread portion, the free ends thereof being bent into inwardly extended cross loops, interlocking members on the rim and the ends of each of the tread units, and means for securing the tread units in annular relation upon the rim, the said means comprising a split ring that extends through all of the said tread units and devices for drawing the free ends of the ring together.

4. In a spring wheel, the combination with a split rim and means for drawing up the ends thereof; of a tire composed of tread units, each formed of spring metal bent into an arch shaped tread face and the free ends bent into inwardly extended crossed loops, interlocking members on the rim and the ends of each of the tread units, means for securing the said tread units in annular relation on the rim, and flexible bands that fit over the exposed portions of the crossed loops of the spring tread units.

5. In a spring wheel, the combination with a split rim and means for drawing up the ends thereof; of a tire composed of units, each formed of spring metal bent into an arch shaped tread face and the free ends bent into inwardly extended crossed loops, interlocking members on the rim and the ends of each of the tread units, means for securing the said tread units in annular relation on the rim, and supplemental spring elements that fit within and coöperate with the looped portions of the tread units.

6. In a spring wheel, the combination with a split rim and means for drawing up the ends thereof; of a tire composed of units, each formed of spring metal bent into an arch shaped tread face and the free ends bent into inwardly extended crossed loops, interlocking members on the rim and the ends of each of the tread units, means for securing the said tread units in annular relation on the rim, and supplemental spring elements that fit within and coöperate with the looped portions of the tread units, the said supplemental spring elements having end portions shaped for interlockable engagement with the rim edges.

7. As an improvement in spring wheels having a spring tread composed of units adapted for being assembled in annular relation around and upon the rim; a wedge shaped tread unit consisting of a spring plate bent to form an arched tread face and having its ends bent to constitute inwardly extended loops that cross into each other and whose ends are shaped for interlockable connection with a wheel rim.

8. As an improvement in spring wheels having a spring tread composed of units adapted for being assembled in annular relation around and upon the rim; a wedge shaped tread unit consisting of a spring plate bent to form an arched tread face and having its ends bent to constitute inwardly extended loops that cross into each other and whose ends are shaped for interlockable connection with a wheel rim, and internal members shaped to hold the arched spring tread portion to shape.

9. As an improvement in vehicle wheels of the character described, the combination with a split rim having means at the ends for drawing the said ends together, a resilient tire composed of wedge shaped units, each bent up from a suitable spring plate blank to form an arch shaped tread portion and with the free ends thereof bent inwardly and outwardly to form spring loops, the loops at one side fitting between the loops at the other side, the extremities of the said free ends and the wheel rim having interlocking elements and disks within the arched portions that rest on the crossed loops and are shaped for maintaining the tread portions of the units in the arched shape.

10. As an improvement in vehicle wheels of the character described, the combination with a split rim having means at the ends for drawing the said ends together, a resilient tire composed of wedge shaped units, each bent up from a suitable spring plate blank to form an arch shaped tread portion and with the free ends thereof bent inwardly and outwardly to form spring loops, the loops at one side fitting between the loops at the other side, the extremities of the said free ends and the wheel rim having interlocking elements and disks within the arched portions that rest on the crossed loops and are shaped for maintaining the tread portions of the units in the arched shape, the disks in each alternate ones of the units and the said units having interlocking portions, the disks in the other alternate ones of the said units being endwise movable within their respective units, and means for holding the said movable disks in frictional contact with the fixedly held disks in the adjacent units.

11. As an improvement in vehicle wheels of the character described, the combination with a split rim having means at the ends for drawing the said ends together, a resilient tire composed of wedge shaped units, each bent up from a suitable spring plate blank to form an arch shaped tread portion and with the free ends thereof bent inwardly and outwardly to form spring loops, the loops at one side fitting between the loops at the other side, the extremities of the said free ends and the wheel rim having interlocking elements and disks within the arched portions that rest on the crossed loops and are shaped for maintaining the tread portions of the units in the arched shape, the disks in each alternate ones of the units and the said units having interlocking portions, the disks in the other alternate ones of the said units being endwise movable within their respective units, and means for holding the said movable disks in frictional contact with the fixedly held disks in the adjacent units, said means consisting of tubular members internally threaded at their opposite ends, buffer springs mounted on the said tubular members for engaging the movable disks and forcing them outwardly and screw bolts engaging the movable members and the tubular members.

12. As an improvement in vehicle wheels of the character described, the combination with a split rim having means at the ends for drawing the said ends together, a resilient tire composed of wedge shaped units, each bent up from a suitable spring plate blank to form an arch shaped tread portion and with the free ends thereof bent inwardly and outwardly to form spring loops, the loops at one side fitting between the loops at the other side, the extremities of the said free ends and the wheel rim having interlocking elements and disks within the arched portions that rest on the crossed loops and are shaped for maintaining the tread portions of the units in the arched shape, the disks in each alternate ones of the units and the said units having interlocking portions, the disks in the other alternate ones of the said units being endwise movable within their respective units, and means for holding the said movable disks in frictional contact with the fixedly held disks in the adjacent units, said means consisting of tubular members internally threaded at their opposite ends, buffer springs mounted on the said tubular members for engaging the movable disks and forcing them outwardly and screw bolts engaging the movable members and the tubular members, the said fixedly held and movable disks each having a central radially elongated aperture, and a split ring that extends through the elongated apertures in all of the disks, and means coöperating with the meeting ends of the split ring for drawing the ring together to bind the annular tread members in close relation.

OLOF A. ECKRE.

Copies of this patent may be obtained for five cents each, by addressing the "Commissioner of Patents, Washington, D. C."